United States Patent
Negri et al.

(10) Patent No.: US 10,927,556 B2
(45) Date of Patent: Feb. 23, 2021

(54) NON-SWELLING REINFORCED DRYWALL JOINT TAPE

(71) Applicant: UNITED STATES GYPSUM COMPANY, Chicago, IL (US)

(72) Inventors: Robert Negri, Lake Villa, IL (US); Guy Rosenthal, Wheaton, IL (US); Salvatore Immordino, Trevor, WI (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 16/380,418

(22) Filed: Apr. 10, 2019

(65) Prior Publication Data

US 2019/0383034 A1    Dec. 19, 2019

Related U.S. Application Data

(60) Provisional application No. 62/685,545, filed on Jun. 15, 2018.

(51) Int. Cl.
*E04F 19/02* (2006.01)
*E04F 19/06* (2006.01)
(Continued)

(52) U.S. Cl.
CPC .............. *E04F 19/022* (2013.01); *C09J 5/06* (2013.01); *E04B 2/721* (2013.01); *E04F 13/042* (2013.01); *E04F 19/062* (2013.01)

(58) Field of Classification Search
CPC ....... E04F 13/042; E04F 13/04; E04F 19/022; E04F 19/062; C09J 5/06
See application file for complete search history.

(56) References Cited

U.S. PATENT DOCUMENTS

| | | | |
|---|---|---|---|
| 2,814,080 A | * | 11/1957 | Tvorik ................. E04F 13/042 52/417 |
| 3,066,450 A | * | 12/1962 | Raffaelli ................ E04F 13/04 52/417 |

(Continued)

FOREIGN PATENT DOCUMENTS

| | | |
|---|---|---|
| EP | 0505492 A1 | 9/1992 |
| JP | 2016-075088 A | 5/2016 |

OTHER PUBLICATIONS

International Application No. PCT/US2019/037010, International Search Report and Written Opinion, dated Oct. 1, 2019.

*Primary Examiner* — Andrew J Triggs
(74) *Attorney, Agent, or Firm* — Marshall, Gerstein & Borun LLP

(57) ABSTRACT

A non-swelling joint tape for use with drywall applications includes a tapered trim strip body extending along a central body axis and a non-swelling backing paper. The tapered trim strip body includes a first surface, a second surface opposite the first surface, a first side, and a second side opposite the first side, and is at least partially constructed from a first dimensionally stable material. The non-swelling backing paper is at least partially secured to the second surface of the tapered trim strip body and is at least partially constructed from a second dimensionally stable material. The tapered trim strip body is dimensioned such that a first thickness between the first surface and the second surface at the central body axis is greater than a second thickness between the first surface and the second surface at the first side and the second side.

9 Claims, 4 Drawing Sheets

(51) Int. Cl.
  *E04B 2/72* (2006.01)
  *E04F 13/04* (2006.01)
  *C09J 5/06* (2006.01)

(56) References Cited

U.S. PATENT DOCUMENTS

| | | | | |
|---|---|---|---|---|
| 4,313,991 | A * | 2/1982 | Lamb | E04F 13/04 428/131 |
| 5,079,042 | A * | 1/1992 | Frings | C04B 28/14 106/778 |
| 5,333,433 | A * | 8/1994 | Porambo | E04F 13/042 52/417 |
| 5,368,907 | A * | 11/1994 | Conboy | E04F 13/04 428/167 |
| 5,628,159 | A * | 5/1997 | Younts | E04B 2/7457 52/417 |
| 6,413,606 | B1 * | 7/2002 | Calderon | B65H 35/0033 428/61 |
| 7,482,291 | B2 | 1/2009 | Newton et al. | |
| 8,257,526 | B2 | 9/2012 | Thompson et al. | |
| 8,770,345 | B2 | 7/2014 | Dugan et al. | |
| 8,795,808 | B2 | 8/2014 | Spanton et al. | |
| 8,931,230 | B2 | 1/2015 | Negri et al. | |
| 8,962,128 | B2 | 2/2015 | Vincent-Beguin et al. | |
| 9,140,015 | B2 | 9/2015 | Negri et al. | |
| 9,169,426 | B2 | 10/2015 | Negri et al. | |
| 9,249,578 | B2 | 2/2016 | Negri et al. | |
| 9,328,023 | B2 | 5/2016 | Rosenthal et al. | |
| 9,365,455 | B2 | 6/2016 | Hargrove et al. | |
| 9,376,824 | B2 | 6/2016 | Neill et al. | |
| 9,377,160 | B1 | 6/2016 | Smythe et al. | |
| 9,388,582 | B1 | 7/2016 | Smythe | |
| 9,783,998 | B2 | 10/2017 | Neill et al. | |
| 2004/0023002 | A1 * | 2/2004 | Wyndham | E04F 13/042 428/156 |
| 2008/0163584 | A1 | 7/2008 | Colucci et al. | |
| 2009/0178357 | A1 | 7/2009 | Francis | |
| 2010/0154349 | A1 * | 6/2010 | Penders | B32B 13/04 52/745.09 |
| 2015/0007519 | A1 | 1/2015 | Negri et al. | |
| 2015/0083303 | A1 | 3/2015 | Negri et al. | |
| 2015/0089893 | A1 | 4/2015 | Rosenthal | |
| 2015/0284543 | A1 | 10/2015 | Hargrove et al. | |
| 2017/0314274 | A1 * | 11/2017 | Rosenthal | E04F 13/24 |
| 2017/0370112 | A1 | 12/2017 | Neill et al. | |
| 2019/0383034 | A1 * | 12/2019 | Negri | E04F 13/042 |

* cited by examiner

NON-SWELLING REINFORCED DRYWALL JOINT TAPE

CROSS REFERENCE TO RELATED APPLICATIONS

This application claims the benefit of U.S. Provisional Application No. 62/685,545, filed on Jun. 15, 2018, the entirety of which is herein expressly incorporated by reference.

FIELD OF THE DISCLOSURE

The present disclosure generally relates to a joint tape for joining at least two sheets of drywall.

BACKGROUND

During the construction process, multiple pieces of board or panels (such as, for example, drywall or gypsum panel products) can be used to form walls, ceilings, floors, partitions, and the like. When multiple panels abut each other, a gap or seam, referred to as a "joint", is defined between the boards. Typically, a joint tape is used to cover, reinforce, and/or conceal the joint when finishing drywall to provide a flat, finished, and clean appearance to the wall or surface. In some past approaches, wallboard joints may be finished by first applying a thin layer of joint compound to the boards over the joint and subsequently embedding the tape into the joint compound. Subsequently, a second coat of joint compound is applied over the embedded joint tape. Last, a third coat of joint compound may be applied which extends further from the edges of the tape as each additional coat of joint compound applied typically extends beyond the edges of the previous coat(s).

In some environments, ends of wallboard panels may be tapered such that the thickness of the wallboard is reduced at the terminating edge relative to the remainder of the wallboard panel. The tapered edges of gypsum wallboard panels may allow finishers to finish the joints by filling in the tapered volume with joint tape and joint compound to the same plane as the remainder of the wallboard. However, as the finisher fills in the tapered volume, they must add several coats of joint compound to accommodate for shrinkage of the joint compound upon drying. Additionally, the finisher must account for swelling and subsequent shrinking of the paper joint tape because it becomes dimensionally unstable when exposed to wet and/or humid environments, especially as it is saturated by wet joint compound. These additional coats of joint compound add labor costs and increase the time required to complete the construction project, particularly due to the time needed for the joint compound to dry. Specifically, the use of joint compound requires a substantial drying time. For example, if a backing paper is used, and exposed to most favorable drying environmental conditions, the joint compound generally requires a drying time of at least twelve hours (which may be extended based on the number of applications of joint compound are required), during which time no finishing or painting may occur.

SUMMARY

In accordance with one embodiment of the present disclosure, a non-swelling joint tape for use with drywall applications includes a tapered trim strip body region extending along a central body axis and a non-swelling backing paper region. The tapered trim strip body includes a first surface, a second surface opposite the first surface, a first side, and a second side opposite the first side, and is at least partially constructed from a first dimensionally stable material. The non-swelling backing paper is at least partially secured to the second surface of the tapered trim strip body and is at least partially constructed from a second dimensionally stable material. The tapered trim strip body is dimensioned such that a first thickness between the first surface and the second surface at the central body axis is greater than a second thickness between the first surface and the second surface at the first side and the second side.

In some approaches, tapered trim strip body may have a triangular cross-section or other geometry that is complementary to the seam angle. Further, the non-swelling backing paper may be constructed from at least one of polymeric fibers or glass fibers. The trim strip body may be constructed from at least one of a polymer or a metallic material.

In some forms, a portion of the non-swelling backing paper is secured to the second surface of the trim strip body without an intervening layer of adhesive material. In other forms, a portion of the non-swelling backing paper is secured to the second surface of the trim strip body via an adhesive.

In some examples, the first thickness may be between approximately 0.15" and approximately 0.50". The second thickness may be between approximately 0.005" and approximately 0.030". In other examples, the first thickness is approximately 50% greater than the second thickness. Other examples are possible.

In accordance with another embodiment of the present disclosure, an approach for forming a non-swelling joint tape for use in connection with drywall applications includes forming a tapered trim strip body and coupling a non-swelling backing paper to the tapered trim strip body. The tapered trim strip body extends along a central body axis and has a first surface, a second surface, a first side, and a second side. Further, the tapered trim strip body is constructed from at least a first dimensionally stable material. The non-swelling backing paper is coupled to the second surface of the tapered trim strip body. Further, the non-swelling backing paper is constructed from a second dimensionally stable material. The tapered trim strip body is formed to have a first thickness between the first surface and the second surface at the central body axis is greater than a second thickness between the first surface and the second surface at at least one of the first side or the second side.

BRIEF DESCRIPTION OF THE DRAWINGS

The above needs are at least partially met through provision of the non-swelling reinforced drywall joint tape described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, a non-swelling reinforced drywall joint tape is provided for use with tapered drywall panels. The non-swelling reinforced drywall joint tape described herein occupies a larger volume of the void created by the tapered region of the tapered drywall panels, thereby requiring less joint compound or other materials to create a smooth transition between adjacent panels. By using less joint compound, labor costs may be reduced. Further, the time required for the joint compound to dry may also be reduced, which may lead to a more efficient construction process. In addition, the non-swelling reinforced drywall joint tape described herein provides an extremely strong and abuse resistant tape that can be used to finish wide gaps between panels and areas that are rough or uneven. By using a joint tape constructed from dimensionally stable materials, preparation times may be further reduced due to no longer needing to account for the joint tape expanding and contracting after coming into contact with the joint compound.

Figure 1A:
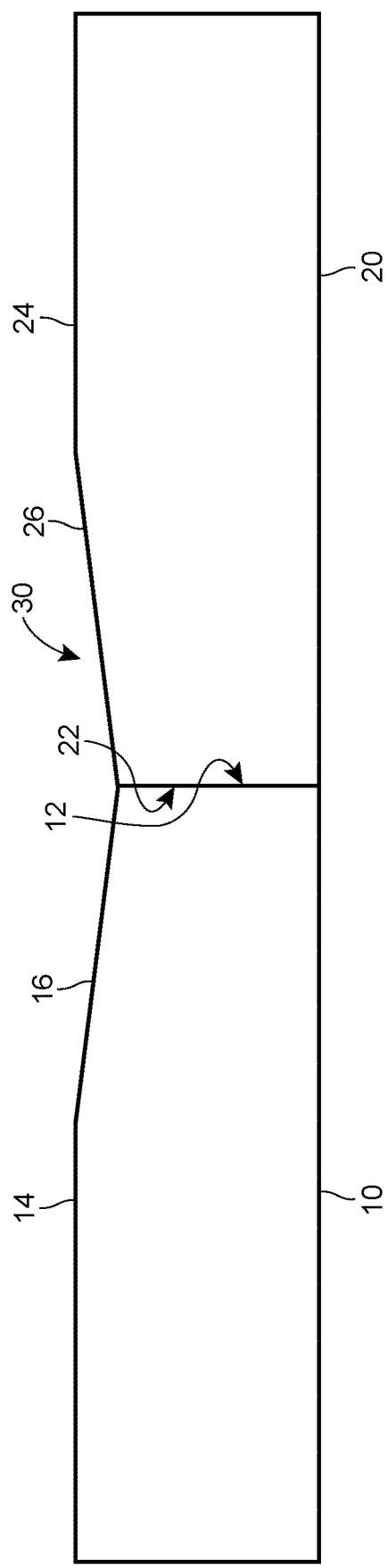
FIG. 1a illustrates a cross-sectional view of an example wall section constructed from wallboard panels having a tapered portion in accordance with various embodiments of the present disclosure.

Referring now to the drawings, and in particular to FIG. 1a, a first drywall panel 10 includes an edge 12, an upper surface 14, and a tapered region 16 defined by the upper surface 14, and a second drywall panel 20 includes an edge 22, an upper surface 24, and a tapered region 26 defined by the upper surface 24. During the construction process, the edge 12 of the first drywall panel 10 abuts the edge 22 of the second drywall panel 20 to form a wall section. Because the first panel 10 and the second panel 20 each include a tapered region 16, 26, respectively, a void region or volume 30 is defined below the planes of the upper surfaces 14, 24. In other words, the thickness at the edges 12, 22, of the panels 10, 20 is less than the thickness of the remainder of the panels 10, 20 at a distance away from the edges 12, 22. The tapered regions 16, 26 may have any number of configurations and/or dimensions desired for particular applications.

Figure 1B:
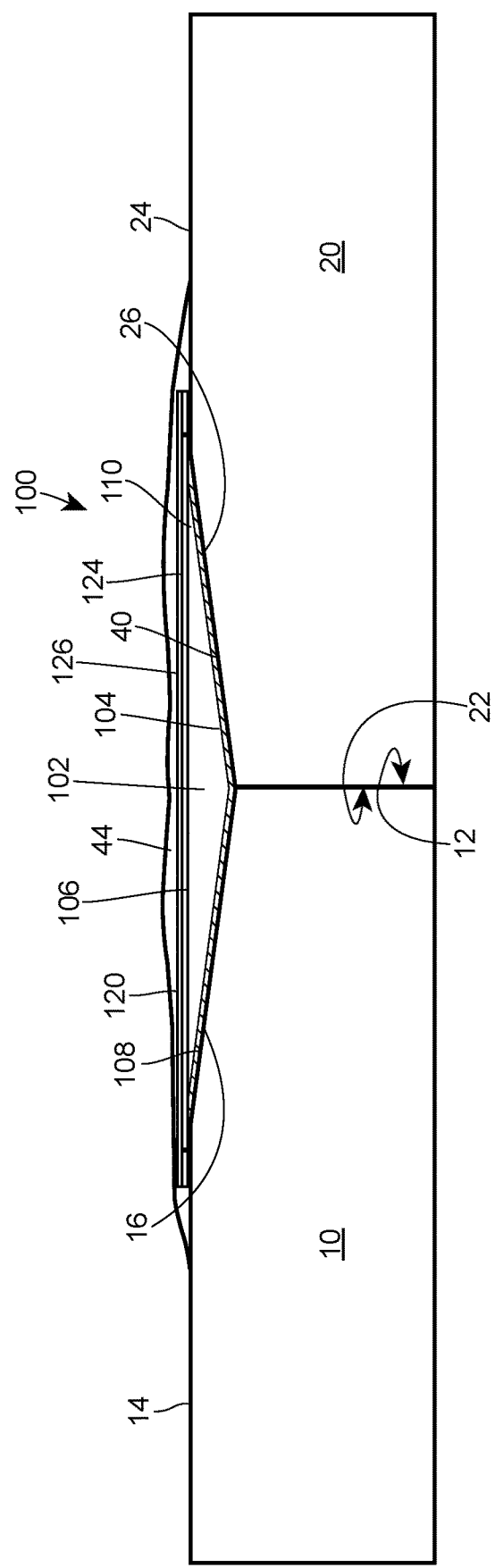
FIG. 1b illustrates a cross-sectional view of an example non-swelling reinforced drywall joint tape in accordance with various embodiments of the present disclosure.
Figure 2:
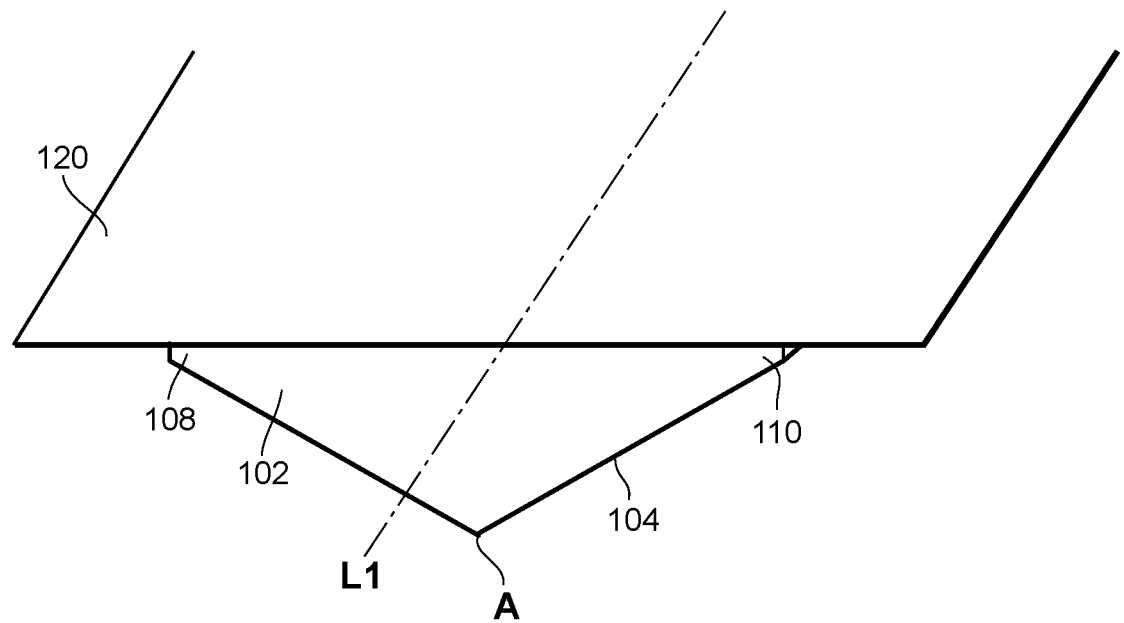
FIG. 2 illustrates a perspective view of the non-swelling reinforced drywall joint tape of FIG. 1b in accordance with various embodiments of the present disclosure.
Figure 3:
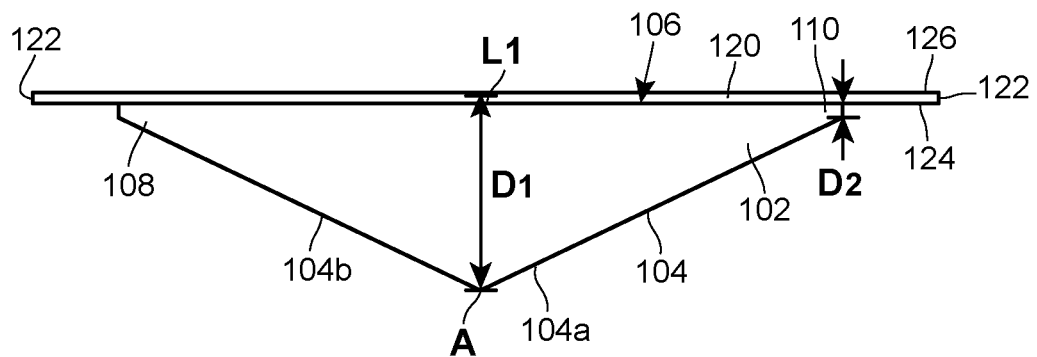
FIG. 3 illustrates a cross-sectional view of the non-swelling reinforced drywall joint tape of FIGS. 1b and 2 in accordance with various embodiments of the present disclosure.

Turning to FIGS. 1b-3, a non-swelling joint tape 100 is provided to be inserted into the void 30 formed by the tapered regions 16, 26 of the first and second panels 10, 20, respectively. The non-swelling joint tape 100 includes a tapered trim strip body 102 and a non-swelling backing paper 120. As illustrated in FIGS. 2 and 3, the tapered trim strip body 102 extends along a central body axis L1 and includes a first or lower surface 104, a second or upper surface 106 opposite the first surface 104, a first side 108, and a second side 110 opposite the first side 108. The first surface 104 is configured to be disposed at or near the tapered regions 16, 26 of the first and second panels 10, 20, and the second surface 106 is generally configured to be exposed to the environment before applying joint compound and/or other products. Further, the first and second sides 108, 110 extend laterally along the central body axis L1 The non-swelling backing paper 120 has outer edges 122, a first surface 124 and a second surface 126. The first surface 124 of the non-swelling backing paper 120 is at least partially secured to the second surface 106 of the tapered trim strip body 102 via any number of approaches discussed herein.

The tapered trim strip body 102 may be constructed from any number and/or combination of suitable materials. In some examples, the tapered trim strip body 102 is constructed from a polymeric material such as polyvinyl chloride (PVC), polyethylene terephthalate (PET), ethylene-vinyl acetate (EVA), polyolefin, polyamide, polystyrene, and the like. In other examples, the tapered trim strip body 102 is constructed from a metallic material such as steel, aluminum, zinc, and the like. Generally, the trim strip body 102 is dimensionally stable, meaning it will not significantly expand or contract upon experiencing moisture (e.g., moisture contained in wet joint compound). The tapered trim strip body 102 may include any number of fillers such as calcium carbonate, fly ash, silica fume, carbon, and/or other materials to adjust its physical properties and/or manufacturing cost.

As illustrated in FIGS. 2 and 3, the tapered trim strip body 102 may have a varying, tapered thickness. Specifically, the tapered trim strip body 102 may have a first thickness D1 at the central body axis L1, and a second thickness D2 at the first and second sides 106, 108. In the illustrated example, the first thickness D1 is greater than the second thickness D2 such that a cross-section of the trim strip body 102 is generally triangular or trapezoidal in shape. In some examples, the first thickness D1 may be between approximately 0.020" and approximately 0.05", and preferably between approximately 0.025" and approximately 0.05". Further, in some examples, the second thickness D2 may be between approximately 0.005" and approximately 0.03", and preferably between approximately 0.01" and approximately 0.025". In other examples, the first thickness D1 is approximately 50% greater than the second thickness D2. In some forms, the thickness at the first side 106 may be different than the thickness at the second side 108.

So configured, the tapered trim strip body 102 may be shaped and dimensioned to closely match the shape and dimensions of the void region 30 formed by the first and second panels 10, 20, and therefore, the tapered trim strip body 102 will occupy a substantial volume (e.g., between approximately 50% and approximately 99%) of the void region 30, regardless of its dimensions and/or shape. Other examples of suitable dimensions D1, D2 may be used to accommodate the void region 30 formed by the first and second panels 10, 20.

In the version depicted in FIGS. 2 and 3, for example, the trim strip body 102 has a triangular cross-sectional shape, as mentioned, and it includes a sharp knife edge apex A when the first surface 104 forms a V-shape at the axis L1. In other versions, this apex A could be rounded, flattened, or otherwise shaped as may be desired to meet a given application.

The non-swelling backing paper 120 may be constructed from a synthetic polymer and/or glass fibers that do not expand when exposed to moisture. For example, the non-swelling backing paper 120 may be constructed via any of the approaches described in U.S. Pat. No. 9,376,824, filed on Dec. 12, 2006, the contents of which are incorporated by reference herein in their entirety. The non-swelling backing paper 120 may have a thickness between approximately 0.001" and approximately 0.02", preferably between approximately 0.005" and approximately 0.012". Other examples are possible.

Figure 5:
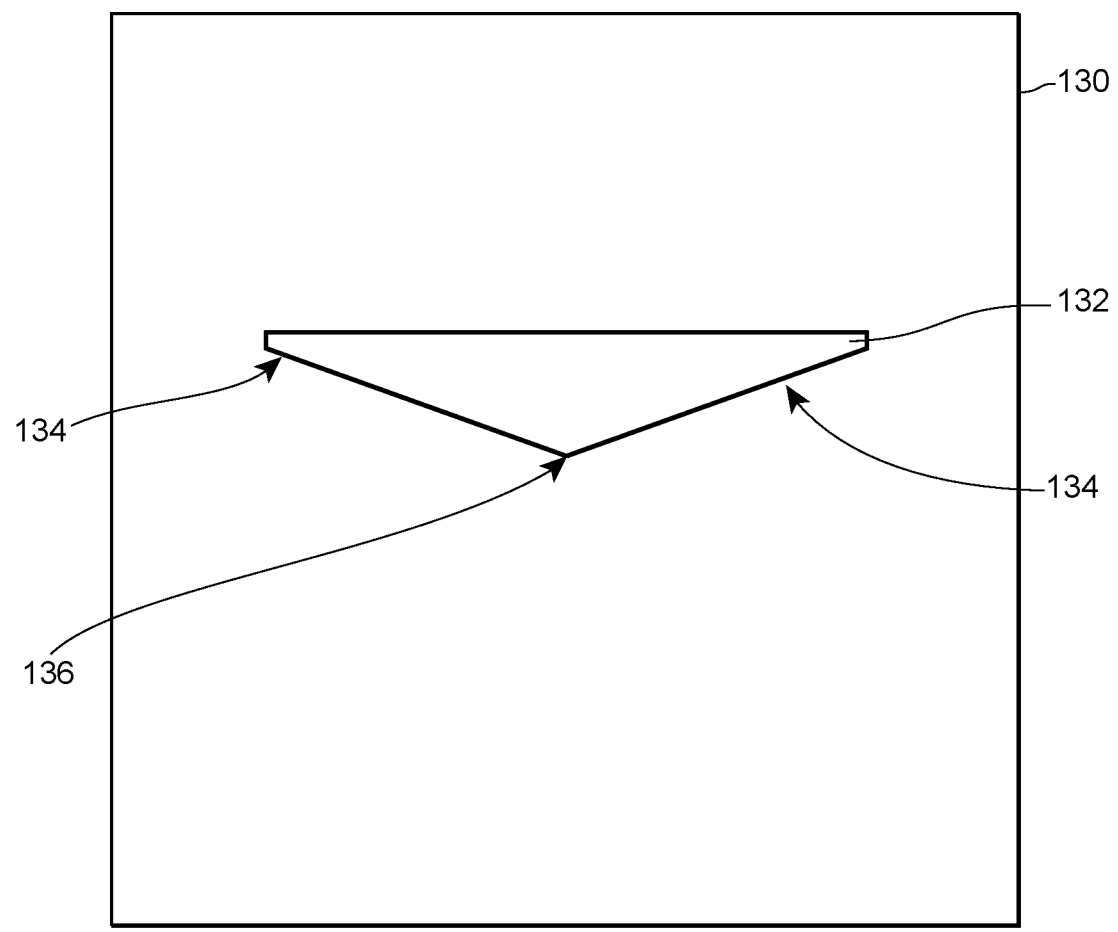
FIG. 5 illustrates an example die for forming a tapered trim strip body in accordance with various embodiments of the present disclosure.

As previously noted, the second surface 106 of the tapered trim strip body 102 is at least partially secured to the first surface 124 of the non-swelling backing paper 120. In some approaches, an adhesive may be applied, sprayed, and/or coupled to at least one of the second surface 106 of the tapered trim strip body 102 and/or the first surface 124 of the non-swelling backing paper 120. In other examples, the tapered trim strip body 102 may be at least partially constructed from an adhesive material that may adhere to the non-swelling backing paper 120. For example, U.S. patent Ser. No. 15/434,980, filed on Feb. 16, 2017, the contents of which are incorporated by reference herein in their entirety, provides a trim strip body that is directly deposited onto the backing paper in a melted state and subsequently adheres to the backing paper upon cooling. In such an example, and as illustrated in FIG. 5, a die 130 has an opening 132 shaped to correspond to the cross-sectional shape of the tapered trim strip body 102 and has tapered edges 134 and a thicker central region 136. In this example, a melted material used to form the tapered trim strip body 102 may be pressed through the opening 132 of the die 130 to form the shape of the tapered trim strip body 102. Other examples are possible.

Figure 4:
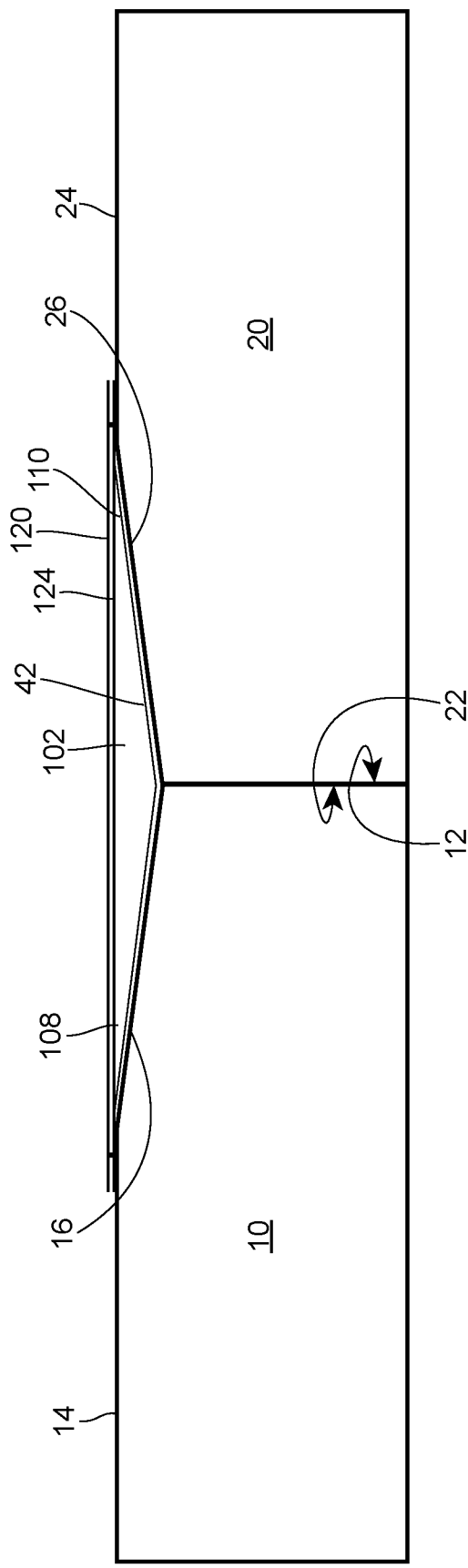
FIG. 4 illustrates a cross-sectional view of an alternative non-swelling reinforced drywall joint tape in accordance with various embodiments of the present disclosure.

In some examples, and as illustrated in FIG. 1b, the non-swelling joint tape 100 may be attached to the first panel 10 and the second panel 20 by first applying a layer of joint compound 40 onto the tapered regions 16, 26 and/or directly onto the first surface 104 of the tapered trim strip body 102. In other examples, and as illustrated in FIG. 4, the non-swelling joint tape 100 may be attached to the first panel 10 and the second panel 20 by applying an adhesive 42 to the tapered regions 16, 26 and/or directly onto the first surface 104 of the tapered trim strip body 102. The use of an adhesive 42 may be preferable to assist in creating a strong bond between the panels 10, 20 and the first surface 104 of the tapered trim strip body 102. Further, by using an adhesive 42, drying times may be substantially reduced relative to using joint compound 40. In these examples, the adhesive 42 may be applied in a liquid state prior to applying the non-swelling joint tape 100 to the wall, or the adhesive 42 may be pre-applied to the first surface 104 of the tapered trim strip body 102 and activated by water or other materials prior to application. In yet other examples, when the tapered trim strip body 102 is at least partially constructed from an adhesive, the tapered trim strip body 102 may be heated to a temperature within its melting point range and subsequently inserted into the void region 30 to solidify and adhere to the panels 10, 20. Other examples are possible.

The non-swelling joint tape 100 is then inserted into the void region 30, whereby the non-swelling joint tape 100 occupies a substantial volume of the void region 30. As illustrated in FIGS. 1b and 4, the outer edges 122 of the non-swelling backing paper 120 may extend a length beyond the tapered regions 16, 26 of the first and second panels 10, 20 and thus may rest on the upper surfaces 14, 24 of the panels 10, 20. As illustrated in FIG. 1b, a user may then cover the non-swelling joint tape 100 with an additional layer of joint compound 44 to create a smooth transition between panels 10, 20 and may complete any additional finishing steps and/or procedures. In some examples, a user may apply an adhesive to the outer edges 122 of the non-swelling backing paper 120 to enhance the bond between the non-swelling backing paper 120 and the panels 10, 20. Subsequently, the user may optionally add a layer of joint compound on top of the second surface 126 of the non-swelling backing paper 120 to create a smooth transition between panels 10, 20.

The tapered body 102 shown and described includes generally planar tapered surfaces 104a, 104b extending from the central axis L1 to the outer edges 108, 110, but in other configurations, these surfaces 104a, 104b could be concave for receiving an adhesive and/or joint compound during installation. In other versions, these surfaces 104a, 104b can be textured and/or porous for the same purpose.

Although not described above, the joint tape 100 of the present disclosure could be sold in sticks of predetermined length, for example in bundles. In other versions, where the strip body 102 is flexible, the joint tape 100 could be sold in rolls.

While the trim strip body 102 disclosed herein has a triangular shape cross-section, other versions could be shaped differently. For example, in other versions, the trim strip body 102 could be trapezoidal, rectangular, square, partially circular or arcuate, or any other suitable shape or geometry that is complementary to the seam angle.

Unless specified otherwise, any of the feature or characteristics of any one of the embodiments of the non-swelling reinforced drywall joint tape disclosed herein may be combined with the features or characteristics of any other embodiments of the non-swelling reinforced drywall joint tape.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A non-swelling joint tape for use in connection with drywall applications, the non-swelling joint tape comprising:

a tapered trim strip body extending along a central body axis and having a first surface, a second surface opposite the first surface, a first side, and a second side opposite the first side, the tapered trim strip body comprising a first dimensionally stable material and an adhesive, such that the tapered trim strip body is configured to be heated to a temperature within a melting point range of the adhesive to adhere the trim strip body to drywall;

a non-swelling backing paper at least partially secured to the second surface of the tapered trim strip body, wherein a portion of the non-swelling backing paper is secured to the second surface of the trim strip body without an intervening layer of adhesive material, the non-swelling backing paper comprising a second dimensionally stable material;

wherein the tapered trim strip body is dimensioned such that a first thickness between the first surface and the second surface at the central body axis is greater than a second thickness between the first surface and the second surface at the first side and the second side.

2. The non-swelling joint tape of claim 1, wherein the tapered trim strip body is triangular in cross-section.

3. The non-swelling joint tape of claim 1, wherein the trim strip body is constructed from at least one of a polymer or a metallic material.

4. The non-swelling joint tape of claim 1, wherein the non-swelling backing paper is constructed from at least one of polymeric fibers or glass fibers.

5. The non-swelling joint tape of claim 1, wherein the first thickness is between approximately 0.15" and approximately 0.50".

6. The non-swelling joint tape of claim 5, wherein the second thickness is between approximately 0.005" and approximately 0.030".

7. The non-swelling joint tape of claim 1, wherein the first thickness is approximately 50% greater than the second thickness.

8. The non-swelling joint tape of claim 1, wherein the trim strip body is directly deposited onto the non-swelling backing paper in a melted state and adheres to the non-swelling backing paper upon cooling.

9. The non-swelling joint tape of claim 8, wherein a cross-section of the trim strip body is formed while the trim strip body is cooling by pressing the trim strip body through an opening of a die.

\* \* \* \* \*